Aug. 25, 1964 H. L. NEWMAN 3,146,447

COMMUNICATION SYSTEM

Filed July 17, 1962 2 Sheets-Sheet 1

INVENTOR,
HAROLD L. NEWMAN.

BY Harry M. Saragovitz

ATTORNEY.

Aug. 25, 1964 H. L. NEWMAN 3,146,447

COMMUNICATION SYSTEM

Filed July 17, 1962 2 Sheets-Sheet 2

INVENTOR,
HAROLD L. NEWMAN.

BY Harry M. Saragovitz

ATTORNEY.

United States Patent Office 3,146,447

Patented Aug. 25, 1964

3,146,447
COMMUNICATION SYSTEM

Harold L. Newman, San Jose, Calif., assignor to the United States of America as represented by the Secretary of the Army Filed July 17, 1962, Ser. No. 210,603
7 Claims. (Cl. 343—100)

Figure 1:
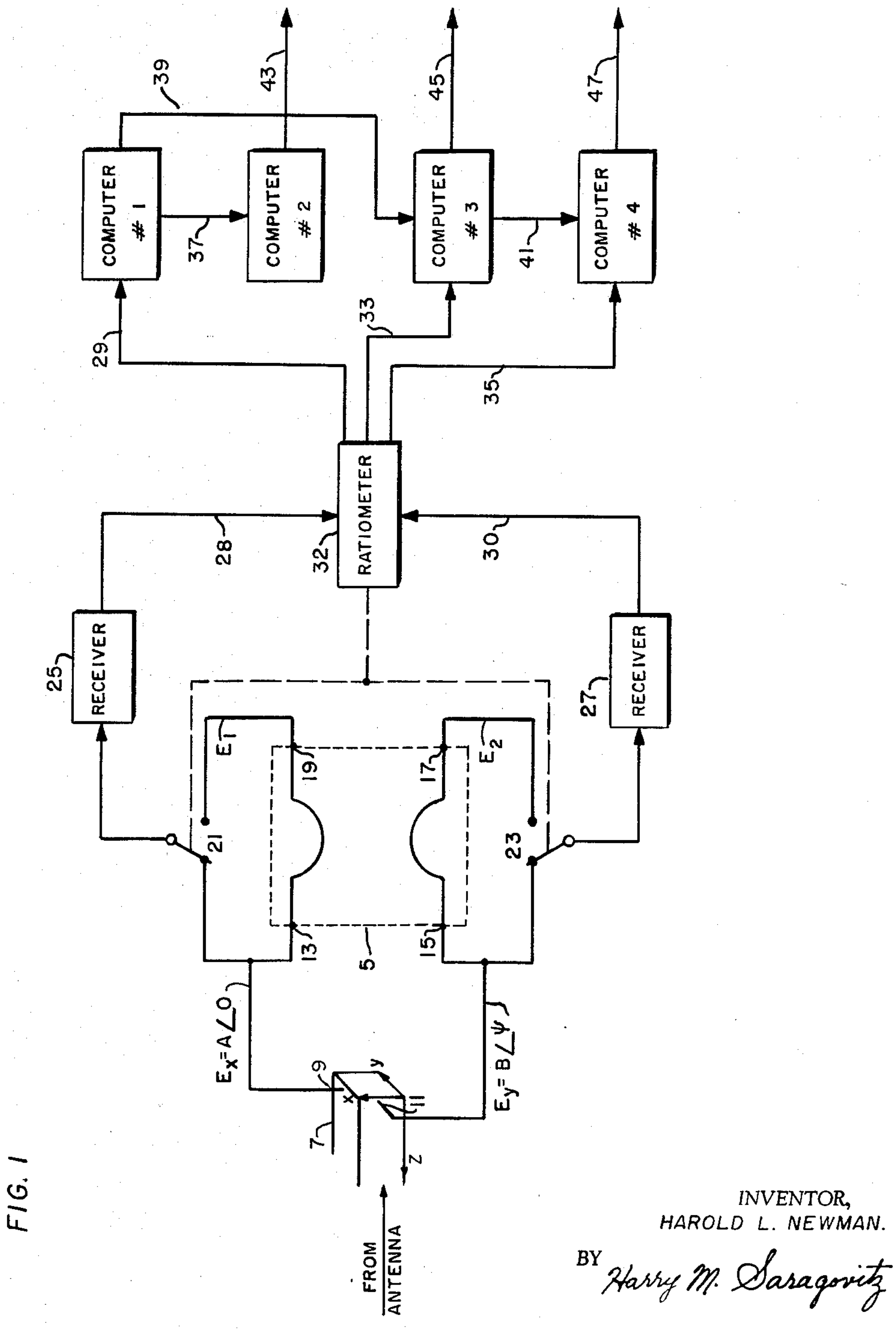

This invention relates to the reception and transmission of electromagnetic waves and more particularly, to apparatus for effecting the maximum power transfer between the antennas in a radio communication system. The invention provides apparatus by means of which a station in a two-way radio communication system may analyze the polarization characteristics of a wave received from a remote station and automatically generate a wave of matching characteristics for transmission to said remote station. Thus, the remote station receives a wave adapted to induce a maximum signal on its antenna system, resulting in maximum efficiency of power transfer.

An elliptically polarized wave is a wave in which the electric field vector rotates at a speed proportional to the wave frequency and with an amplitude which varies during the rotation in such a fashion as to describe an ellipse. The three parameters necessary to specify such a wave are: the axial ratio, the sense of rotation and the orientation angle. The axial ratio refers to the ratio of the minor to the major axis of the ellipse, the sense of rotation refers to the direction of rotation of the electric vector, being right hand if the vector rotates clockwise as the wave recedes from an observer and left hand if the vector rotates counter-clockwise under the same conditions. The orientation angle refers to the angle between the major (or minor) axis and a chosen reference line in space. Elliptically polarized waves are formed by combining two sinusoidal components launched from points in space quadrature. For example, if a pair of dipoles crossed at 90° are excited with signals of equal amplitude and an arbitrary phase difference, the rotating field vector characteristics of elliptical polarization will be formed; with the major axis of the ellipse bisecting two of the 90° angles at which the dipoles are crossed. If the two signals are in time phase the "ellipse" has an axial ratio of zero and linear polarization results. If the signals differ in time phase by 90° or 270°, the axial ratio becomes unity and circular polarization results. Thus it is seen that both linear and circular polarization are special cases of elliptical polarization. The sense of rotation depends on whether the time phase difference is leading or lagging.

Briefly stated, the present invention comprises means for extracting the orthogonal components from a received elliptically polarized wave, measuring the phase angle between these components, the axial ratio, sense of rotation and orientation angle by utilizing the magnitudes or absolute values of said orthogonal components only. This information is then used to automatically generate a transmitted wave of matching polarization.

It is therefore an object of this invention to provide a communication system of increased efficiency.

It is a further object of the invention to provide novel circuitry for measuring the polarization characterstics of electromagnetic waves.

A further object of this invention is to provide novel apparatus for producing a transmitted wave of any desired polarization characteristics.

Figure 2:
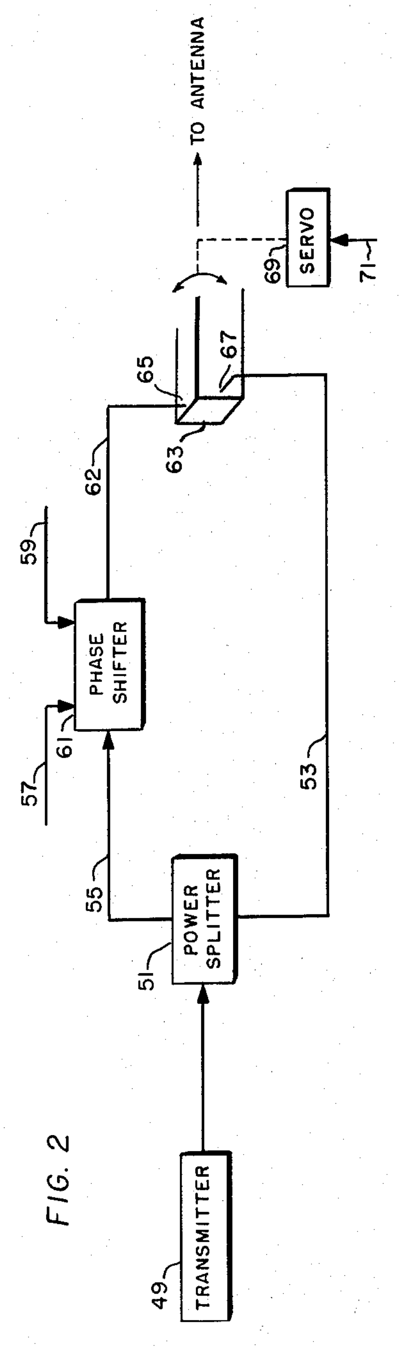
Figure 3:
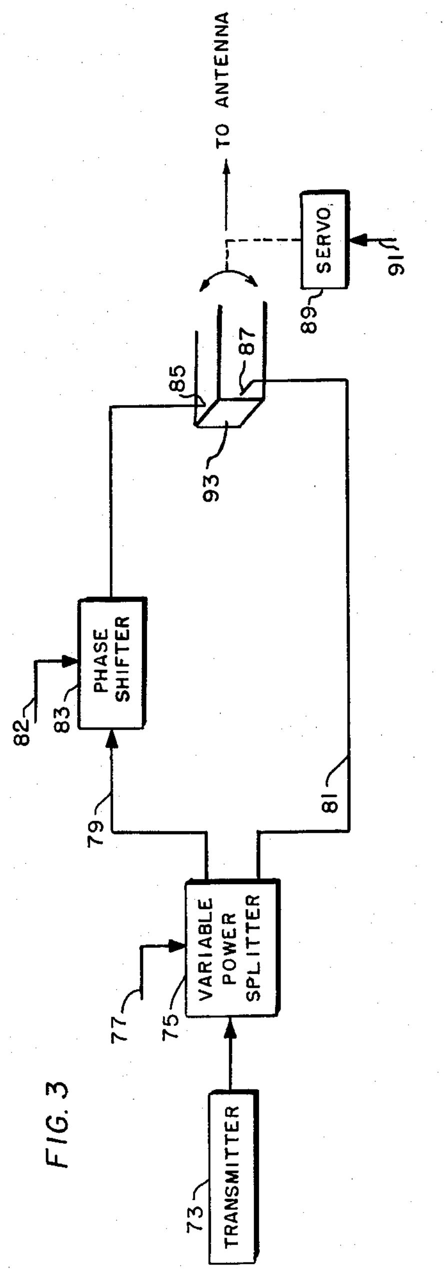

Other objects and advantages of this invention will become apparent from the following detailed description and drawings, in which FIG. 1 illustrates circuitry for analyzing the polarization characteristics of an incoming wave, and FIGS. 2 and 3 illustrate different means for synthesizing these polarization characteristics.

Referring now to FIG. 1, the elliptically polarized received wave is applied to waveguide 7 from an antenna, not shown. Probes 9 and 11, mounted in space quadrature within the waveguide, sense the orthogonal components of the wave and apply these components to the two inputs, 13 and 15, of 3 db directional coupler 5. Directional coupler 5 is a four-port device possessing the property that a wave applied to one input will appear at the two outputs with equal amplitudes which are .707 (down 3 db) of the original amplitude. Further, one of the outputs will be 90° displaced in phase relative ot the other output. If the orthogonal components, $E_x = A\angle O$ and $E_y = B\angle\psi$, of the received wave are applied to the two directional coupler inputs, 13 and 15, as shown in FIG. 1, the outputs at terminals 19 and 17 will be, respectively:

$$E_1 = .707\ A\angle O + .707\ B\angle\psi + 90° \qquad (1)$$

$$E_2 = .707\ B\angle\psi + .707\ A\angle 90° \qquad (2)$$

due to the above-mentioned characteristics of the directional coupler 5. A fixed phase shift caused by the coupler itself will also be added to each output, however this has been neglected because only the relative phase differences are significant in this analysis. Equations 1 and 2 can be rewritten as:

$$E_1 = .707\ (A - B \sin\psi + jB \cos\psi) \qquad (3)$$

$$E_2 = .707\ [B \cos\psi + j\ (A + B \sin\psi)] \qquad (4)$$

The ratio of the square of the absolute magnitudes of these outputs is, after simplification:

$$\left[\frac{E^1}{E^2}\right]^2 = K^2 = \frac{A^2 + B^2 - 2AB \sin\psi}{A^2 + B^2 + 2AB \sin\psi} \qquad (5)$$

Solving for $\psi$ yields the relationship:

$$\sin\psi = \frac{A^2 + B^2}{2AB}\left[\frac{1 - K^2}{1 + K^2}\right] \qquad (6)$$

which can be rewritten as:

$$\sin\psi = \tfrac{1}{2}\left[\frac{A}{B} + \frac{1}{A/B}\right]\left[\frac{1 - K^2}{1 + K^2}\right] \qquad (7)$$

Equation 7 shows that the sine of the phase angle ($\psi$) between the two orthogonal voltage components may be obtained merely from the amplitudes of the components themselves and from special combinations of these amplitudes. As can be seen from FIG. 1, all of the terms necessary to compute $\sin\psi$ from Equation 7 are available as either inputs or outputs of directional coupler 5. In order to accomplish this computation, two receivers 25 and 27 are arranged to alternately sample the inputs and outputs of 5, by means of ganged switches 21 and 23. In the position shown in FIG. 1, the receivers are directly connected to probes 9 and 11, therefore the receiver outputs on lines 28 and 30 will be proportional to A and B, respectively, the magnitudes of the orthogonal components. Ratiometer 32 calculates the ratio $A/B$, and its reciprocal, $B/A$, and stores this information for later use. The ganged switches 21 and 23 are then transferred to the two outputs of the directional coupler and the voltages $E_1$ and $E_2$ are fed to the two receivers and thence to the ratiometer over lines 28 and 30, respectively. Ratiometer 32 then calculates the ratio of the absolute values of these two voltages and squares the result which is equal to $K^2$ of Equations 5 and 7. $K^2$ is stored in 32 for subsequent use in the computing operation. The switches 21 and 23 are controlled from the ratiometer in order to associate the above-described calculations with the proper switch positions.

Computer 1 of FIG. 1 is arranged to solve Equation 7, utilizing the values of $A/B$ and $K^2$ stored in the ratiometer, and fed to computer 1 over line 29. The solution of this equation, sin $\psi$, appears on line 37 at the output of computer 1. Computer 1, as well as the other computers are illustrated in block form only, since the specific circuitry therein is well known per se and forms no part of the invention. The circuitry of computer 1 may comprise, for example, summing circuits, subtracting and multiplying circuitry, etc. interconnected in such a manner as to solve Equation 7. Computer 1 also calculates the value of cos $\psi$, which can be easily found from the value of sin $\psi$. Cos $\psi$ appears on line 39.

The outputs of the ratiometer and computer 1 can be used to automatically compute the polarization characteristics of the received wave. This operation will now be explained. Computer 2 determines the sense of rotation of the received wave. The sense of rotation depends merely on whether sin $\psi$ is negative or positive; if the sense is right hand or clockwise, sin $\psi$ will be positive and conversely if the sense is left hand or counterclockwise, sin $\psi$ will be negative. Sin $\psi$ is fed to computer 2 over line 37. The output of computer 2 appears on line 43. The output signal will assume one of two possible values which represent the two possibilities mentioned above. The circuitry of computer 2 may comprise, for example, a pair of oppositely polarized diodes both connected to input line 37. The polarity of the input signal will then depend on which diode conducts, and this will determine which of the two possible output signals appears on line 43.

Computer 3 computes the orientation angle from the relation:

$$\tan 2\theta = \frac{2 \cos \psi}{A/B - B/A} \qquad (8)$$

wherein $\theta$ is the orientation angle. The derivation of this relationship is as follows:

In the most general case of polarization, the wave comprises two orthogonal components which differ in amplitude and phase. These components are:

$$E_x = A \cos \omega t \qquad (9)$$

$$E_y = B \cos (\omega t - \psi) \qquad (10)$$

wherein $\psi$ is the time phase difference between the components. From 9:

$$\cos \omega t = \frac{E_x}{A} \qquad (11)$$

$$\sin \omega t = \sqrt{1 - \cos^2 \omega t}$$

therefore:

$$\sin \omega t = \sqrt{1 - \frac{E_x^2}{A^2}} \qquad (12)$$

Utilizing the trigonometric identities, Equation 10 can be rewritten as:

$$E_y = B \cos \omega t \cos \psi + B \sin \psi t \sin \psi \qquad (13)$$

Substituting Equations 11 and 12 in 13 and simplifying yields:

$$\frac{E_x^2}{A^2} - \frac{2E_xE_y}{AB} \cos \psi + \frac{E_y^2}{B^2} = \sin^2 \psi \qquad (14)$$

which is the general equation of an ellipse with its major axis inclined at some angle $\theta$ to the $E_x$ axis. To determine this angle it is necessary to express Equation 14 in terms of a coordinate system ($E_x'$, $E_y'$) which is rotated through an angle $\theta$ with respect to the original system. The ellipse will then be symmetrical with respect to this rotated system and hence will have no cross-product term in its equation. Using simple trigonometric relationship:

$$E_x = E_x' \cos \theta - E_y' \sin \theta \qquad (15)$$

$$E_y = E_x' \sin \theta + E_y' \cos \theta \qquad (16)$$

Substituting Equations 15 and 16 in 14 and collecting terms yields:

$$\left[\frac{\cos^2 \theta}{A^2} - \frac{2 \sin \theta \cos \theta \cos \psi}{AB} + \frac{\sin^2 \theta}{B^2}\right] E_x'^2 + \left[\frac{-2 \sin \theta \cos \theta}{A^2} - \frac{2(\cos^2 \theta - \sin^2 \theta) \cos \psi}{AB} + \frac{2 \sin \theta \cos \theta}{B^2}\right] E_x'E_y' + \left[\frac{\sin^2 \theta}{A^2} - \frac{2 \sin \theta \cos \theta \cos \psi}{AB} + \frac{\cos^2 \theta}{B^2}\right] E_y'^2 = \sin^2 \psi \qquad (17)$$

Since the cross-product term of an ellipse symmetrical about its coordinate axes vanishes, the coefficient of the $E_x'$, $E_y'$ term may be equated to zero:

$$-\frac{2 \sin \theta \cos \theta}{A^2} - \frac{2(\cos^2 \theta - \sin^2 \theta) \cos \psi}{AB} + \frac{2 \sin \theta \cos \theta}{B^2} = 0 \qquad (18)$$

Since:

$$2 \sin \theta \cos \theta = \sin 2\theta \qquad (19)$$

and:

$$\cos^2 \theta - \sin^2 \theta = \cos 2\theta \qquad (20)$$

Equation 18 may now be rewritten as:

$$-\frac{\sin 2\theta}{A^2} - \frac{2 \cos 2\theta \cos \psi}{AB} + \frac{\sin 2\theta}{B^2} = 0 \qquad (21)$$

Dividing Equation 21 by cos $2\theta$ yields:

$$-\frac{\tan 2\theta}{A^2} - \frac{2 \cos \psi}{AB} + \frac{\tan 2\theta}{B^2} = 0 \qquad (22)$$

Solving for tan $2\theta$ yields:

$$\tan 2\theta = \frac{2AB}{A^2 - B^2} \cos \psi \qquad (23)$$

which may be rewritten as:

$$\tan 2\theta = \frac{2 \cos \psi}{A/B - B/A} \qquad (24)$$

which is the desired result (Equation 8).

It can be seen from the foregoing that all the terms necessary for the solution to Equation 24 are available as inputs to computer 3. Cos $\psi$ is fed from computer 1 over line 39 and the two ratios $A/B$ and $B/A$ are sequentially fed from ratiometer 32 over line 33. Computer 3 performs the arithmetic operations indicated by Equation 24 and produces a signal proportional to tan $2\theta$ on line 41. Once tan $2\theta$ is determined it is a simple matter to solve for $\theta$, the orientation angle, which appears at the output of computer 3 on line 45.

In order to determine the axial ratio, consider again Equation 17, which is that of an ellipse which has been referred to a new set of coordinate ($E_x'$, $E_y'$); such that the ellipse is symmetrical thereto. Under these conditions the cross-product term vanishes and this equation can be rewritten as:

$$\left[\frac{\cos^2 \theta}{A^2} - \frac{2 \sin \theta \cos \theta \cos \psi}{AB} + \frac{\sin^2 \theta}{B^2}\right] E_x'^2 + \left[-\frac{\sin^2 \theta}{A^2} - \frac{2 \sin \theta \cos \theta \cos \psi}{AB} + \frac{\cos^2 \theta}{B^2}\right] E_y'^2 = \sin^2 \psi \qquad (25)$$

Dividing both sides of 25 by $\sin^2 \psi$ and simplifying yields:

$$\frac{E_x'^2}{\dfrac{2A^2B^2 \sin^2 \psi}{(A^2+B^2)\left(1 - \dfrac{A^2-B^2}{A^2+B^2} \sec 2\theta\right)}} + \frac{E_y'^2}{\dfrac{2A^2B^2 \sin^2 \psi}{(A^2+B^2)\left(1 + \dfrac{A^2-B^2}{A^2+B^2} \sec 2\theta\right)}} = 1 \qquad (26)$$

It can be seen that 26 is the standard form of the equation for an ellipse, namely, $x^2/a^2+y^2/b^2=1$, in which "$a$" is the major semi-axis and "$b$" the minor semi-axis. From 26:

$$a=\frac{\sqrt{2}AB\sin\psi}{\sqrt{(A^2+B^2)\left(1-\frac{A^2-B^2}{A^2+B^2}\sec 2\theta\right)}} \quad (27)$$

and $$b=\frac{\sqrt{2}AB\sin\psi}{\sqrt{(A^2+B^2)\left(1+\frac{A^2-B^2}{A^2+B^2}\sec 2\theta\right)}} \quad (28)$$

Hence the axial ratio, $b/a$, equals:

$$\sqrt{\frac{1-\frac{A^2-B^2}{A^2+B^2}\sec 2\theta}{1+\frac{A^2-B^2}{A^2+B^2}\sec 2\theta}} \quad (29)$$

which can be simplified to:

$$\frac{b}{a}=\sqrt{\frac{1-\frac{\frac{A^2}{B^2}-1}{\frac{A^2}{B^2}+1}\sec 2\theta}{1+\frac{\frac{A^2}{B^2}-1}{\frac{A^2}{B^2}+1}\sec 2\theta}} \quad (30)$$

Referring again to FIG. 1, computer 4 receives the ratio of the absolute magnitudes of the orthogonal components, $A/B$, from ratiometer 32 over line 35, squares this signal to obtain $A^2/B^2$, receives $\tan^2\theta$ from computer 3 over line 41 and from this obtains $\sec^2\theta$ by solving the trigonometric relationship $\sec 2\theta=\sqrt{1+\tan^2 2\theta}$. Computer 4 then uses these values to solve Equation 30. A signal representing the axial ratio appears on line 47. Thus it is seen that the polarization analyzer of FIG. 1 provides complete information on the polarization characteristics of the received wave. While the apparatus of FIG. 1 utilizes two receivers which are alternately switched between the inputs and outputs of the directional coupler, it will be apparent that four receivers, each fixedly connected to a different input or output of the directional coupler could be used, however the illustrated circuitry is the more economical. In order to obtain accurate polarization measurements, the gains of each receiver should be the same, in order that the ratios of their outputs be an accurate measure of the ratios of their inputs. This can be accomplished, for example, by arranging the AGC circuit of one of the receivers to simultaneously control the gains of all the receivers.

At the same time that the polarization of the incoming wave is being obtained, the transmitted polarization must be synthesized to match it. Matching consists of having the same axial ratio, opposite senses of rotation relative to the same frame of reference in which the incoming wave sense of polarization was measured, and the same angle of orientation. The matching must be accomplished automatically and continuously from information derived from the polarization analysis process.

One means for synthesizing the transmitted polarization ellipse is illustrated in FIG. 2. In this apparatus, two sinusoidal components of equal amplitude and arbitrary phase relationship are radiated from points in space quadrature to form the elliptically polarized wave. The axial ratio depends on the magnitude of the relative phase shift between the components and the sense of rotation depends on the sense of the phase shift, however the angle of orientation remains fixed relative to the radiating points. It is therefore necessary to mechanically rotate the radiating system in order to provide for arbitrary orientation angle. In FIG. 2, the transmitter power is fed to power splitter 51 which divides the power into two equal-amplitude, co-phasal components which appear on lines 55 and 53. That portion of the power on line 53 is fed directly to radiator 67, mounted in a waveguide 63, which is capable of supporting orthogonal modes of propagation. The other half of the power is fed to automatically controlled phase shifter 61, the output of which energizes radiator 65, mounted in waveguide 63 in space quadrature to radiator 67. Phase shifter 61 is conjointly controlled by two signals derived from the polarization analyzer of FIG. 1, these signals representing the sense of rotation and the axial ratio, and fed thereto over lines 57 and 59, respectively. It can be shown that any axial ratio, ranging from zero, representing linear polarization, to unity, representing circular polarization, can be obtained by means of phase shifts ranging between 0 and 90°. At any given axial ratio, the sense of rotation will depend on whether the phase shift is a leading or lagging one, therefore the phase shifter 61 must be capable of providing any phase shift between −90° and +90°, said phase shift being conjointly determined by the desired axial ratio and sense of rotation. In order to vary the orientation angle to match that of the received wave, the waveguide 63 and also its associated antenna (not shown) must be mechanically rotated around the axis of propagation of the transmitted wave. In order to accomplish this, servo 69 in FIG. 2 is arranged to provide the required rotation of the waveguide and antenna in response to an input signal representing the orientation angle and fed thereto over line 71. The input to servo 69 is obtained from the output of computer 3 of FIG. 1. It can be shown that any orientation angle can be obtained by rotating waveguide 63 through 180°.

Alternately, the transmitted wave may be synthesized by combining two orthogonal components in time phase quadrature but of different amplitudes. In this embodiment, illustrated in FIG. 3, the variable power splitter 75 is arranged to divide the power received from transmitter 73 unequally between its two outputs, the amplitude ratio of the outputs being automatically determined in accordance with the required axial ratio. One of the outputs of the power splitter is fed directly to radiator 87 in waveguide 93 and the other output to radiator 85 via phase shifter 83. The power division ratio is controlled in accordance with the required axial ratio by means of a signal fed to 75 over line 77 from computer 4 of FIG. 1. With the variable amplitude ratio system of FIG. 3, the phase of one of the orthogonal components must be shifted by 90°, the sense of this 90° shift determines the sense of rotation. Phase shifter 83 provides the required phase shift. A signal fed thereto over line 82 from computer 2 in FIG. 1 determines whether the phase shift is −90° or +90°. As with the apparatus of FIG. 2, the radiating system must be rotated in order to vary the orientation angle. This is accomplished by means of servo 89, which operates in the same fashion as servo 69 in FIG. 2.

Thus it can be seen that the present disclosure provides apparatus for rapidly and automatically determining the polarization characteristics of an incoming wave and automatically generating a transmitted wave of matching characteristics.

It will be obvious to those skilled in the art that many changes and modifications may be made thereto without departing from the spirit of the invention, hence the invention should be limited only by the scope of the following claims.

What is claimed is:

1. Apparatus for determining and synthesizing the polarization characteristics of an eliptically polarized received wave comprising, means to abstract the orthogonal components of said received wave, a directional coupler, a pair of receivers, means to couple said orthogonal components to separate inputs of said directional coupler, the inputs of each of said receivers being alternately connectible to an input and the corresponding output of said directional coupler, the outputs of said receivers being connected to a ratiometer, said ratiometer being adapted to sequentially compute the ratio of the absolute magnitudes of the inputs of said directional coupler, the reciprocal of said ratio and the ratio of the square of the absolute magnitude of the outputs of said directional coupler, a first computer adapted to receive the output of said ratiometer and derive therefrom two signals proportional to the sine and the cosine of the time phase difference between said orthogonal components by solving the equation:

$$\sin \psi=\frac{1}{2}\left[\frac{A}{B}+\frac{1}{A/B}\right]\left[\frac{1-K^2}{1+K^2}\right]$$

wherein $\psi$ is said time phase difference, $A/B$ is said first-named ratio and $K^2$ is said last-named ratio, a second computer adapted to determine the polarity of sin $\psi$ and thereby indicate the sense of rotation of said received wave, a third computer adapted to solve the equation:

$$\tan 2\theta=\frac{2 \cos \psi}{A/B-BA}$$

utilizing signals applied from said ratiometer and said first computer and thereby indicating the orientation angle of said received wave, a fourth computer adapted to receive the values of $A/B$ from said ratiometer and tan $2\theta$ from said third computer and compute therefrom the axial ratio, $b/a$, of said received wave from the equation:

$$b/a=\sqrt{\frac{1-\frac{\frac{A^2}{B^2}-1}{\frac{A^2}{B^2}+1}\sec 2\theta}{1+\frac{\frac{A^2}{B^2}-1}{\frac{A^2}{B^2}+1}\sec 2\theta}}$$

and means connected to the outputs of said computers to automatically generate a transmitted wave which matches the polarization characteristics of said received wave.

2. Apparatus for determining and synthesizing the polarization characteristics of an eliptically polarized received wave comprising, means to abstract the orthogonal components of said received wave, a directional coupler, a pair of receivers, means to couple said orthogonal components to separate inputs of said directional coupler, the inputs of each of said receivers being alternately connectible to an input and the corresponding output of said directional coupler, the outputs of said receivers being connected to a ratiometer, said ratiometer being adapted to sequentially compute the ratio of the absolute magnitudes of the inputs of said directional coupler, the reciprocal of said ratio and the ratio of the square of the absolute magnitudes of the outputs of said directional coupler, a first computer adapted to receive the output of said ratiometer and derive therefrom two signals proportional to the sine and cosine of the time phase difference between said orthogonal components by solving the equation:

$$\sin \psi=\frac{1}{2}\left[\frac{A}{B}+\frac{1}{A/B}\right]\left[\frac{1-K^2}{1+K^2}\right]$$

wherein $\psi$ is said time phase difference, $A/B$ is said first-named ratio and $K^2$ is said last-named ratio, a second computer adapted to determine the polarity of sin $\psi$ and thereby indicate the sense of rotation of said received wave, a third computer adapted to solve the equation:

$$\tan 2\theta=\frac{2 \cos \psi}{A/B-B/A}$$

utilizing signals supplied from said ratiometer and said first computer and thereby indicating the orientation angle of said received, a fourth computer adapted to receive the values of $A/B$ from said ratiometer and tan $2\theta$ from said third computer and comput therefrom the axial ratio, $b/a$, of said received wave from the equation:

$$b/a=\sqrt{\frac{1-\frac{\frac{A^2}{B^2}-1}{\frac{A^2}{B^2}+1}\sec 2\theta}{1+\frac{\frac{A^2}{B^2}-1}{\frac{A^2}{B^2}+1}\sec 2\theta}}$$

a transmitter, a power splitter adapted to receive the output of said transmitter and divide the output thereof into two equal-amplitude, co-phasal components, means to apply one of said components directly to a first radiator, means to shift the phase of the other of said components, the magnitude of the phase shift being automatically controlled by the output of said fourth computer and the sense of said phase shift being controlled by the output of said second computer, means to apply said phase shifted component to a second radiator arranged in space quadrature to said first radiator, and means to automatically rotate said radiators around the direction of propagation by an amount proportional to the output of said third computer.

3. Apparatus for determining and synthesizing the polarization characteristics of an elliptically polarized received wave, comprising means to abstract the orthogonal components of said received wave, a directional coupler, a pair of receivers, means to couple said orthogonal components to separate inputs of said directional coupler, the inputs of each of said receivers being alternately connectible to an input and the corresponding output of said directional coupler, the outputs of said receivers being nected to a ratiometer, said ratiometer being adapted to sequentially compute the ratio of the absolute magnitudes of the inputs of said directional coupler, the reciprocal of said ratio and the ratio of the square of the absolute magnitudes of the outputs of said directional coupler, a first computer adapted to receive the output of said ratiometer and derive therefrom two signals proportional to the sine and cosine of time phase difference between said orthogonal components by solving the equation:

$$\mathrm{Sin}\ \psi=\frac{1}{2}\left[\frac{A}{B}+\frac{1}{A/B}\right]\left[\frac{1-K^2}{1+K^2}\right]$$

wherein $\psi$ is said time phase difference, $A/B$ is said first-named ratio and $K^2$ is said last-named ratio, a second computer adapted to determine the polarity of sin $\psi$ and thereby indicate the sense of rotation of said received wave, a third computer adapted to solve the equation:

$$\tan 2\theta=\frac{2 \cos \psi}{A/B-B/A}$$

utilizing signals supplied from said ratiometer and said first computer and thereby indicate the orientation angle of said received wave, a fourth computer adapted to receive the values of $A/B$ from said ratiometer and tan $2\theta$ from said third computer and compute therefrom the axial ratio, $b/a$, of said received wave from the equation:

$$b/a=\sqrt{\frac{1-\frac{\frac{A^2}{B^2}-1}{\frac{A^2}{B^2}+1}\sec 2\theta}{1+\frac{\frac{A^2}{B^2}-1}{\frac{A^2}{B^2}+1}\sec 2\theta}}$$

a transmitter, a variable power splitter adapted to receive the output of said transmitter and divide the output thereof into two co-phasal components with an amplitude ratio dependent on the output of said fourth computer, means to feed one of said components directly to a first radiator, means to shift the phase of the other of said components by either +90° or −90° depending on the output of said second computer, and means to feed said phase shifted component to a second radiator arranged in space quadrature to said first radiator, and means responsive to the output of said third computer to rotate said radiators around the axis of propagation.

4. Apparatus for generating an electromagnetic wave of arbitrary polarization, comprising: a transmitter, means to split the output of said transmitter into two equal-amplitude, co-phasal components, means to feed one of said components directly to a radiator, means to automatically shift the phase of the other of said components, the magnitude of said shift being automatically controlled in accordance with a desired axial ratio and the sense of the phase shift being automatically controlled in accordance with a desired sense of rotation of said electromagnetic wave, means to feed said phase-shifted component to a second radiator arranged in space quadrature to said first radiator, and a servo circuit having an output mechanically connected to said radiators and arranged to rotate said radiators around the axis of propagation of said wave in accordance with an electrical signal applied to the input of said servo circuit, said electrical signal being proportional to a desired orientation angle of said wave.

5. Apparatus for generating an electromagnetic wave of arbitrary polarization, comprising: a transmitter, means to split the output of said transmitter into two co-phasal components, means to automatically control the amplitude ratio of said components in accordance with a desired axial ratio of said wave, means to feed one of said components directly to a first radiator, means to automatically shift the phase of the other component by either +90° or −90° depending on a desired sense of rotation of said wave, means to feed the phase-shifted component to a second radiator mounted in space quadrature to said first radiator, and a servo circuit having an output mechanically connected to said radiators and arranged to rotate said radiators around the axis of propagation of said wave in accordance with an electrical signal applied to the input of said servo circuit, said electrical signal being proportional to a desired orientation angle of said wave.

6. An electromagnetic wave polarization analyzer and synthesizer, comprising: means to abstract the orthogonal components of a received wave of arbitrary polarization, means to compute the sense of rotation, orientation angle and axial ratio of said received wave by utilizing only the amplitudes of said components and the amplitudes of combinations of said components, and means responsive to the computed quantities to automatically generate a transmitted wave of matching polarization characteristics.

7. An electromagnetic wave polarization analyzer and synthesizer comprising, a 3 db directional coupler, means to abstract the orthogonal components of a received wave and apply said orthogonal components to the inputs of said 3 db directional coupler, means to compute the sense of rotation, orientation angle and axial ratio of said received wave by utilizing only the amplitudes of said orthogonal components and the amplitudes of combinations of said components derived from the outputs of said 3 db directional coupler, and means responsive to the computed quantities automatically synthesize a wave of matching polarization.

References Cited in the file of this patent

UNITED STATES PATENTS

| | | |
|---|---|---|
| 2,619,635 | Chait | Nov. 25, 1952 |
| 3,055,003 | Marston et al. | Sept. 18, 1962 |

OTHER REFERENCES

"Study of Polarization Modulation Techniques," by Joseph E. Ferris, Melpar, Inc., February 1961; prepared for Electronics Research Directorate, Air Force Cambridge Research Labs., Office of Aerospace Research, U.S. Air Force, Bedford, Mass., AFCRL 94. Pages 17–20 relied on.